United States Patent
Beattie, Jr. et al.

(10) Patent No.: US 11,210,700 B2
(45) Date of Patent: *Dec. 28, 2021

(54) METHOD AND APPARATUS FOR MANAGING ADVERTISEMENTS

(71) Applicants: AT&T Intellectual Property I, L.P., Atlanta, GA (US); AT&T Mobility II LLC, Atlanta, GA (US)

(72) Inventors: James G. Beattie, Jr., Bergenfield, NJ (US); Jeffrey A. Krinsky, Woodinville, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/927,429

(22) Filed: Jul. 13, 2020

(65) Prior Publication Data
US 2020/0342495 A1 Oct. 29, 2020

Related U.S. Application Data

(63) Continuation of application No. 15/240,741, filed on Aug. 18, 2016, now Pat. No. 10,783,552.

(51) Int. Cl.
*G06Q 30/02* (2012.01)
*H04W 4/021* (2018.01)

(52) U.S. Cl.
CPC ..... *G06Q 30/0255* (2013.01); *G06Q 30/0261* (2013.01); *G06Q 30/0267* (2013.01); *H04W 4/021* (2013.01)

(58) Field of Classification Search
None
See application file for complete search history.

(56) References Cited

U.S. PATENT DOCUMENTS 8,352,980 B2 1/2013 Howcroft
8,677,395 B2 3/2014 Dharmaji et al.
(Continued)

FOREIGN PATENT DOCUMENTS

CN 1838167 A 9/2006
CN 101075327 A 11/2007
(Continued)

OTHER PUBLICATIONS

Divecha, Farhad, "Dwell Time to Measure Digital Branding", www.accurcast.com, Mar. 10, 2010, 4 pages.
(Continued)

*Primary Examiner* — Naresh Vig
(74) *Attorney, Agent, or Firm* — Guntin & Gust, PLC; Ralph Trementozzi

(57) ABSTRACT

Aspects of the subject disclosure may include, for example, a method including receiving advertisements from a remote advertising content provider and pre-loading the advertisements at a communication device. An advertisement is selected for presentation at a presentation device, based on a user's advertising viewing history, the duration of the advertisement, the device location, the device environment, the user's demographic profile, or the user's activities. The presentation device presents the advertisement responsive to the trigger message. The effectiveness of the advertisement is determined, and the advertisement viewing history is updated; the advertisement is selected based in part on the effectiveness of a past presentation of the advertisement. Other embodiments are disclosed.

20 Claims, 9 Drawing Sheets

(56) References Cited

U.S. PATENT DOCUMENTS

| | | |
|---|---|---|
| 8,868,639 B2 | 10/2014 | Raleigh et al. |
| 9,154,826 B2 | 10/2015 | Raleigh et al. |
| 9,305,308 B2 | 4/2016 | Smereka et al. |
| 9,338,233 B2 | 5/2016 | Raleigh et al. |
| 10,339,572 B2 | 7/2019 | Tully et al. |
| 2007/0113243 A1 | 5/2007 | Brey et al. |
| 2008/0033814 A1 | 2/2008 | Carignano et al. |
| 2008/0109317 A1 | 5/2008 | Singh |
| 2008/0215437 A1 | 9/2008 | Levy et al. |
| 2009/0006194 A1 | 1/2009 | Sridharan et al. |
| 2009/0048914 A1 | 2/2009 | Shenfield et al. |
| 2009/0070217 A1 | 3/2009 | Dharmaji et al. |
| 2009/0198580 A1 | 8/2009 | Broberg et al. |
| 2011/0112907 A1 | 5/2011 | Seo et al. |
| 2011/0153431 A1 | 6/2011 | Kim et al. |
| 2013/0191226 A1 | 7/2013 | Smallwood et al. |
| 2014/0280133 A1 | 9/2014 | Dulitz |
| 2015/0058113 A1* | 2/2015 | Yi .................... G06Q 30/0242 705/14.41 |
| 2015/0058114 A1 | 2/2015 | Yi |
| 2015/0269624 A1 | 9/2015 | Cheng et al. |
| 2016/0170991 A1* | 6/2016 | Birchall .................. H04L 67/20 707/751 |
| 2016/0371735 A1 | 12/2016 | Walden |
| 2017/0018005 A1 | 1/2017 | Walden |
| 2017/0109796 A1 | 4/2017 | Rahle et al. |
| 2018/0053212 A1 | 2/2018 | Beattie, Jr. et al. |

FOREIGN PATENT DOCUMENTS

| | | |
|---|---|---|
| GB | 2443953 A | 5/2008 |
| JP | 2007249359 A | 9/2007 |
| JP | 2012216973 A | 11/2012 |
| KR | 20140032680 | 9/2012 |
| KR | 20140105076 A | 9/2014 |
| KR | 20140107732 A | 9/2014 |
| WO | 2011087640 A1 | 7/2011 |

OTHER PUBLICATIONS

Hung, Jason, "Adaptive Caching and Presentation Mechanism to Enhance M-Learning Market", ftp://192.192.125.23/Files/1202004/002-A884-5530-19911599-200907-20-2-29-44-a.pdf, Discloses an adaptive caching and presentation mechanism for e-learning with mobile devices, that will include the user's profile—learning history, learning progress, user's background, user's preference, and user location., 2009.

Judic, Liva, "Dwell Time as Ad Campaign KPI: Yes, But . . . ", www.searchenginewatch.com, May 6, 2010, 15 pages.

Murphy, Ian P., "Facebook Now Targets Ads Based on User Dwell Times", Retail Dive, Oct. 1, 2015, 2 pages.

Prochkova, Irena, "Enabling Energy-Efficient Advertising for Mobile Applications", http://nordsecmob.aalto.fi/en/publications/theses2013/thesis_irena.pdf, 2013.

* cited by examiner

100

300

500

700

METHOD AND APPARATUS FOR MANAGING ADVERTISEMENTS

CROSS REFERENCE TO RELATED APPLICATIONS

This application is a continuation of U.S. patent application Ser. No. 15/240,741 filed Aug. 18, 2016. The contents of each of the foregoing is hereby incorporated by reference into this application as if set forth herein in full.

FIELD OF THE DISCLOSURE

The subject disclosure relates to a method and apparatus for managing advertisements

BACKGROUND

Distribution and selection of effective personalized advertisements can depend on numerous factors besides the demographic profile of the intended viewer. For example, the time of day, the viewer's location, and the viewer's current activities can all influence the effectiveness of an advertisement presented to a viewer at a particular time.

BRIEF DESCRIPTION OF THE DRAWINGS

Reference will now be made to the accompanying drawings, which are not necessarily drawn to scale, and wherein.

DETAILED DESCRIPTION

Figure 1:
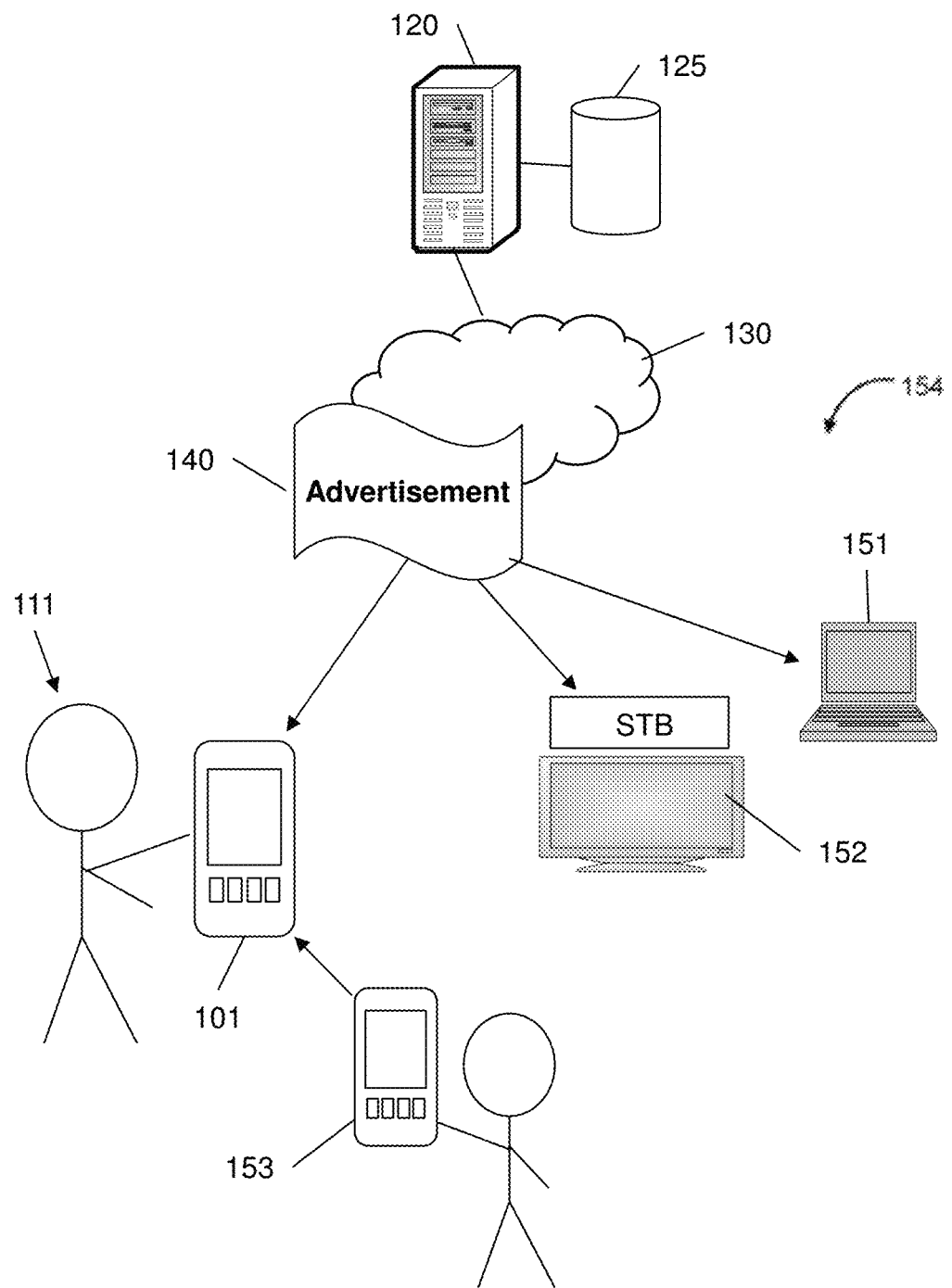
FIG. 1 depicts an illustrative embodiment of a system for distributing personalized advertisements.

The subject disclosure describes, among other things, illustrative embodiments for pre-loading advertisements at a communication device and triggering presentation of selected advertisements, and assessing the effectiveness of the presentation. Other embodiments are described in the subject disclosure.

One or more aspects of the subject disclosure include a device comprising a processing system including a processor, and a memory that stores executable instructions that, when executed by the processing system, facilitate performance of operations. The operations comprise receiving a plurality of advertisements from equipment of a remote advertising content provider, and storing the plurality of advertisements. The operations also comprise determining a location of the device, obtaining environmental data associated with the device location, accessing a demographic profile of a user of the device, accessing a calendar of the user to determine activities of the user, and determining, based on an advertisement viewing history of the user, a duration of an advertisement to be presented to the user. The operations further comprise selecting an advertisement from the plurality of advertisements for presentation at a presentation device; the selecting is based at least in part on the advertising viewing history and the duration of the advertisement and is based at least on the device location, the environmental data, the demographic profile, the activities, or a combination thereof. The operations also comprise determining a presentation time for the advertisement, and transmitting a trigger message at the presentation time to the presentation device; the presentation device presents the advertisement responsive to the trigger message. The operations further comprise determining a length of time that the advertisement is viewed by the user, assessing an effectiveness of the advertisement based on comparing the length of time with the duration of the advertisement, and updating the advertisement viewing history according to the assessing.

One or more aspects of the subject disclosure include a machine-readable storage medium, comprising executable instructions that, when executed by a processing system including a processor, facilitate performance of operations. The operations comprise receiving a plurality of advertisements from equipment of a remote advertising content provider, and storing the plurality of advertisements. The operations also comprise determining a location of the processing system, obtaining environmental data associated with the location, accessing a demographic profile of a user, accessing a calendar of the user to determine activities of the user, and determining, based on an advertisement viewing history of the user, a duration of an advertisement to be presented to the user. The operations further comprise selecting an advertisement from the plurality of advertisements for presentation at a presentation device; the selecting is based at least in part on the advertising viewing history and the duration of the advertisement and is based at least on the location, the environmental data, the demographic profile, the activities, or a combination thereof. The operations also comprise transmitting a trigger message to the presentation device; the presentation device presents the advertisement responsive to the trigger message. The operations further comprise determining a length of time that the advertisement is viewed by the user, assessing an effectiveness of the advertisement based on comparing the length of time with the duration of the advertisement, and updating the advertisement viewing history according to the assessing.

One or more aspects of the subject disclosure include a method comprising receiving, by a processing system including a processor, a plurality of advertisements from equipment of a remote advertising content provider; storing the plurality of advertisements; determining a location of the processing system; obtaining environmental data associated with the location; accessing a demographic profile of a user; accessing a calendar of the user to determine activities of the user; and determining, based on an advertisement viewing history of the user, a duration of an advertisement to be presented to the user. The method also comprises selecting an advertisement from the plurality of advertisements for presentation at a presentation device; the selecting is based at least in part on the advertising viewing history and the duration of the advertisement and is based at least on the location, the environmental data, the demographic profile, the activities, or a combination thereof. The method also comprises determining a presentation time for the advertisement, and transmitting a trigger message at the presentation time to the presentation device; the presentation device presents the advertisement responsive to the trigger message. The method also comprises determining a length of time that the advertisement is viewed by the user, assessing an effectiveness of the advertisement based on comparing the length of time with the duration of the advertisement, and updating the advertisement viewing history according to the assessing; the advertisement is selected based in part on the effectiveness of a past presentation of the advertisement.

FIG. 1 depicts an illustrative embodiment of a system 100 in which segments of media content (e.g., advertisements) are distributed and pre-loaded on user equipment (UE) devices. In this embodiment, a device user 111 has a mobile device 101 that can present an advertisement. User 111 is at a location where other media devices (e.g., personal computer 151, television with set-top box 152) can also present an advertisement to the user.

A server 120, remote from the user 111, transmits advertising via a network 130. The server can be operated by an advertising content provider that maintains storage 125 of advertisements; storage device 125 is coupled to the server and can contain a large inventory of advertisements (or other media segments).

In this embodiment, server 120 distributes advertisement 140 for presentation to viewer 111. In general, the advertisement will not be presented at the time it is distributed, but is loaded onto a storage medium accessible to a presentation device 154. In this embodiment, the advertisement 140 is personalized to viewer 111; for example, the server may obtain a demographic profile for the user from device 101 and use that profile to extract advertisements from storage 125 that match the profile.

As shown in FIG. 1, advertisement 140 can be transmitted to and loaded on any of a variety of devices, for example UE 101, personal computer 151, a set-top box coupled to a television 152, etc. Advertisement 140 is thus pre-loaded on a user-accessible device, and is presented to the user in response to a trigger message.

In an embodiment, UE 101 is located close to device 153 of another user, and obtains an advertisement from device 153 in a short-range peer-to-peer communication session.

Figure 2:
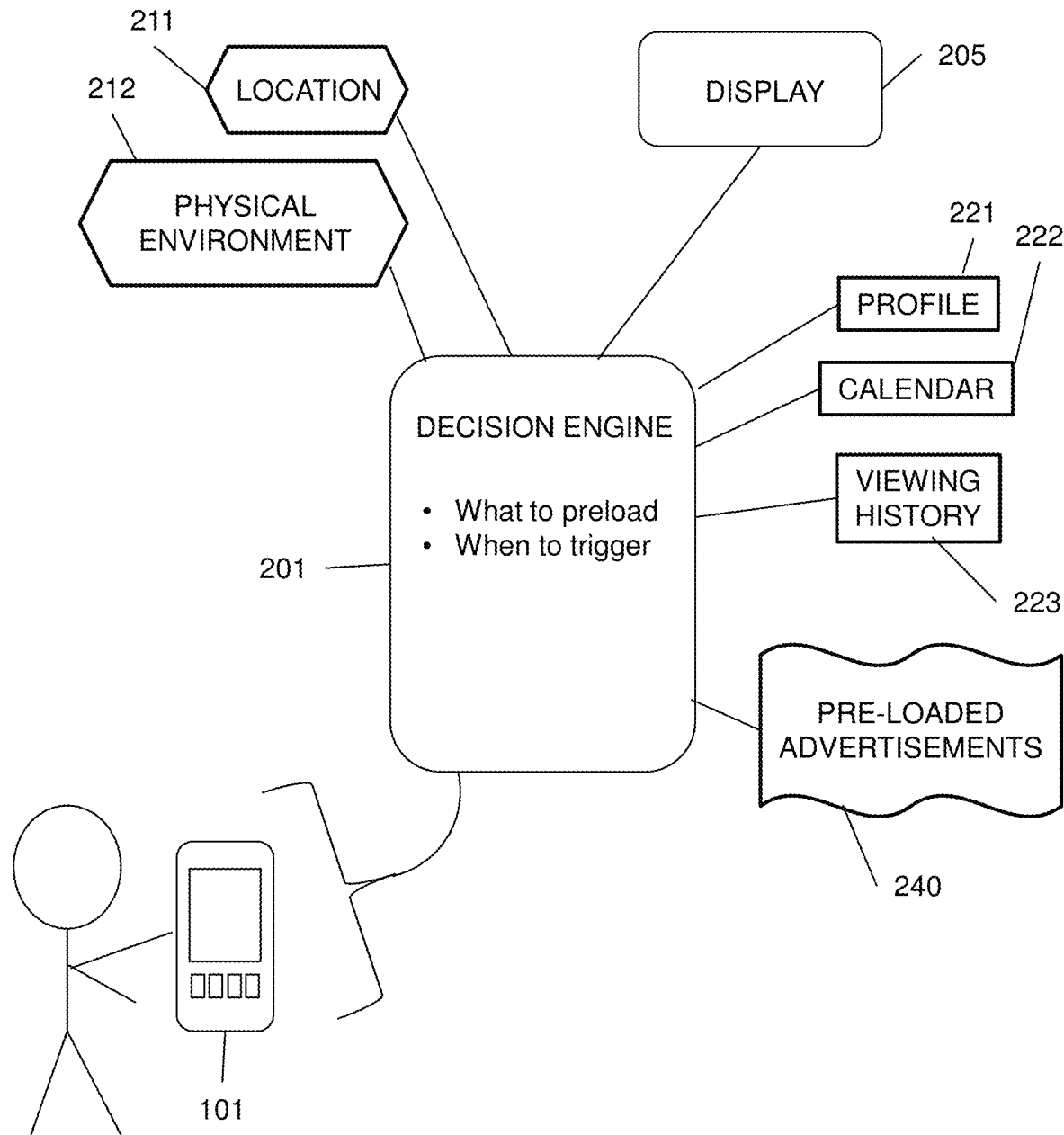
FIG. 2 schematically illustrates a system including a user device with pre-loaded advertisements, in accordance with an embodiment of the disclosure.

FIG. 2 schematically illustrates a system 200 including a decision engine 201 executing on device 101, in accordance with an embodiment of the disclosure. As device 101 receives advertisements, the decision engine can determine which advertisements to pre-load. As device 101 changes locations while user 111 engages in various activities, the decision engine 201 can determine when a particular advertisement from the pre-loaded advertisements 240 is to be triggered for presentation to the user. In an embodiment, decision engine 201 is pre-installed on the user device 101. In another embodiment, the decision engine is obtained by downloading from a server of a services provider subscribed to by the user. In a further embodiment, the decision engine is obtained by transferring from another user in a short-range peer-to-peer communication session.

As shown in FIG. 2, decision engine 201 accesses data including the location 211 of the device, and information from sensors regarding the physical environment 212 of the device. Decision engine 201 can also access a demographic profile 221 of the user; profile 221 can include the user's likes/dislikes and consumer preferences in addition to demographic data. In this embodiment, decision engine 201 can obtain information from the user's calendar 222 regarding activities engaged in by the user. The decision engine thus can determine where the user is, what is happening around the user, and what the user is doing; this permits the decision engine to make a real-time selection from the pre-loaded advertisements 240 of an advertisement for presentation at a display device (for example display 205 included in UE 101 and coupled to decision engine 201).

In an embodiment, decision engine 201 also can access the user's viewing history 223. The viewing history can include, for example, identifiers of advertisements previously viewed by the user, and a length of time that the user viewed a given advertisement. The decision engine can analyze viewing history data to determine, for example, that the user viewed certain advertisements for 6 seconds or less (indicating that such ads did not engage the user's attention) and viewed certain other advertisements for more than 25 seconds (indicating that such ads engaged the viewer's attention and thus were more effective). In an embodiment, decision engine 201 can determine if the user's attention is engaged for longer time periods at certain times of the day, or when carrying out specific activities. In another embodiment, decision engine 201 can also obtain data from multiple presentations of an advertisement, to determine for example if a subsequent presentation of the advertisement engaged the user's attention for as long as the first presentation. In particular embodiments, the duration of viewer engagement with an advertisement can be determined by monitoring for a channel change during presentation of the advertisement, movement of the device, or a combination of these.

Each presentation of an advertisement can add further information to the viewing history for the user. As the viewing history accumulates, the decision engine 201 can use the viewing history to make more accurate assessments of an advertisement's expected effectiveness. For example, if the user's calendar indicates that the user is performing a recurring task (e.g., daily, weekly, etc.), the decision engine can determine which advertisement was effective (that is, engaged the user's attention for longer than a threshold period of time) the previous time that the user performed the task.

In an embodiment, UE 101 communicates with nearby devices belonging to other users with similar profiles (e.g., device 153 in FIG. 1), so that decision engine 201 can access the viewing history of the other user. This can provide decision engine 201 with additional information that is useful in determining an effective advertisement for user 111.

Figure 3:
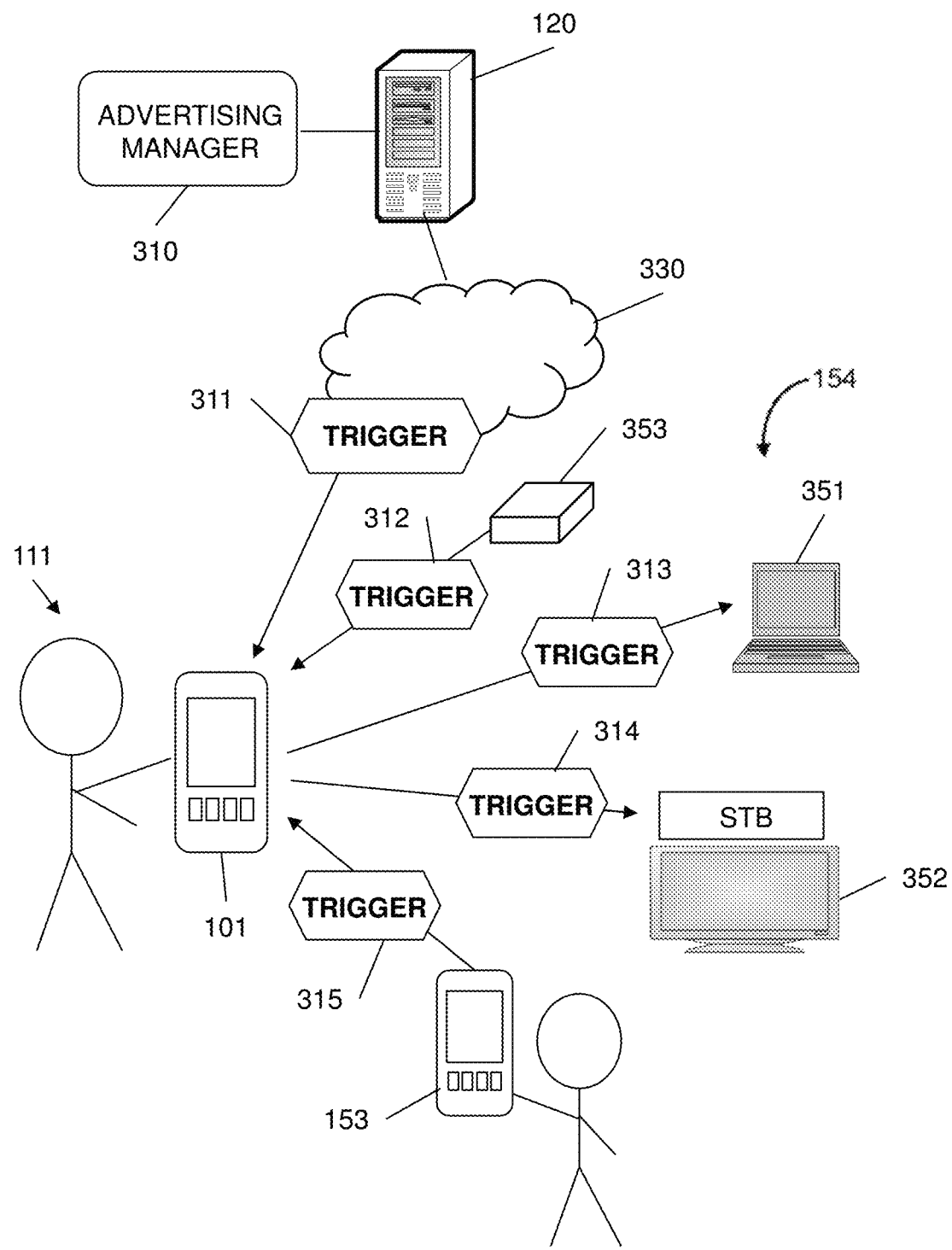
FIG. 3 depicts an illustrative embodiment of a system for triggering presentation of personalized advertisements.

FIG. 3 schematically illustrates a system 300 in which trigger messages are sent to initiate presentation of a pre-loaded advertisement, in accordance with embodiments of the disclosure. In one embodiment, a trigger 311 identifying a particular advertisement is broadcast via a network 330 in response to a message from an advertising manager 310 executing on advertising content provider server 120. In this embodiment, trigger 311 is received at UE 101, causing the advertisement to be retrieved from the pre-loaded advertisements 240 and presented at display 205 (or some other display device accessible to UE 101, for example television 352). Trigger 311 can specify that the advertisement is to be presented immediately when the trigger is received; alternatively, trigger 311 can direct that the advertisement be presented after a specified delay period.

In another embodiment, an environmental sensor 353 signals a change in the environment of user 111; this signal is received at UE 101 and interpreted by decision engine 201 as a trigger 312 for presentation of a pre-loaded advertisement. For example, sensor 353 can be a weather sensor; when sensor 353 signals that it is raining at the user's location, decision engine 201 proceeds to retrieve and present an advertisement for an umbrella.

In another embodiment, UE 101 receives a trigger 315 from a nearby device 153 in a short-range peer-to-peer communication session. In this embodiment, device 153 belongs to a user with interests similar to those of user 111 and a similar viewing history. Decision engine 201 thus can leverage the information collected by device 153 to present an effective advertisement to user 111.

In additional embodiments, the decision engine 201 can determine that a particular advertisement is to be retrieved from the pre-loaded advertisements 240, and send a trigger 313 or 314 to presentation devices 154 external to UE 101 (personal computer 351 or television 352, respectively).

Figure 4:
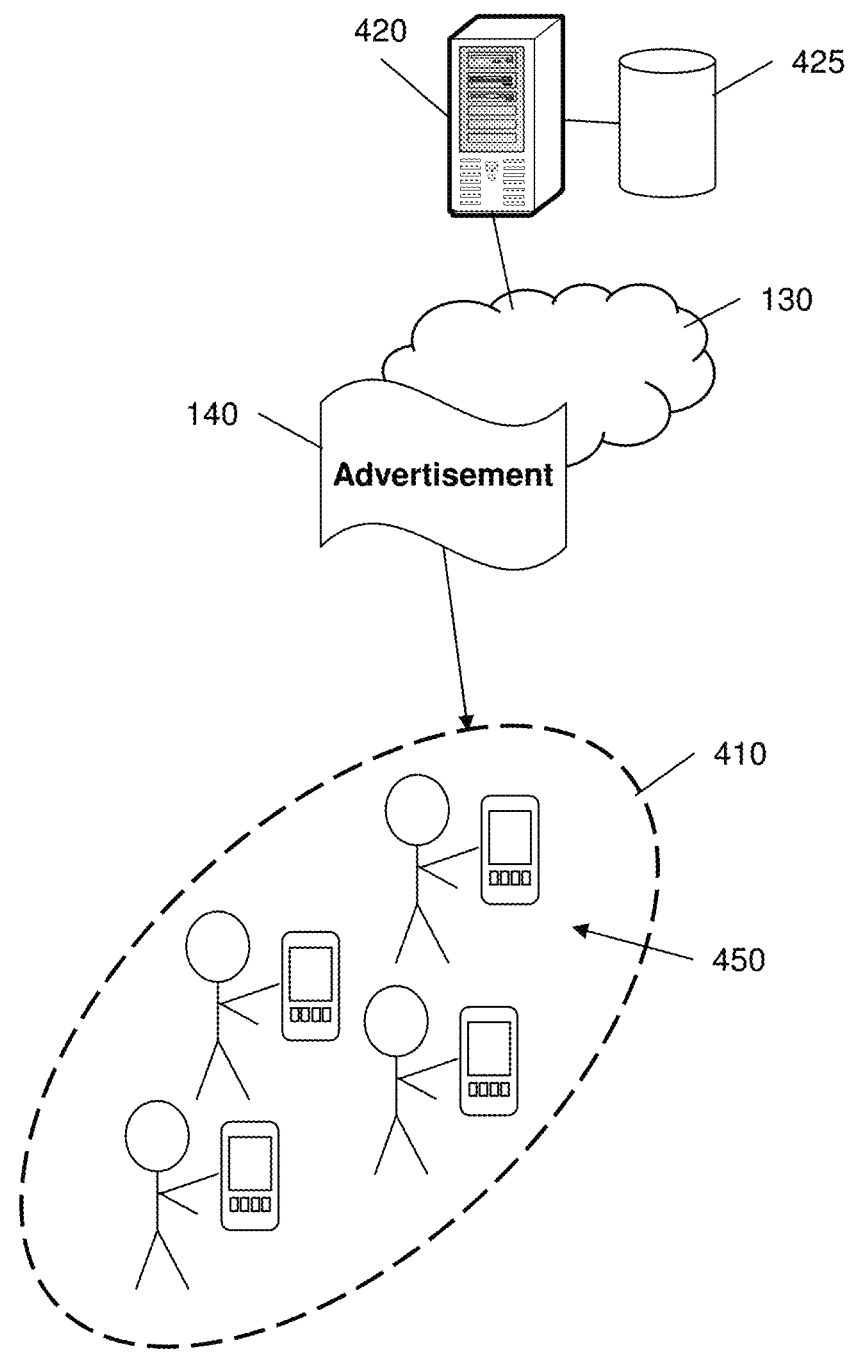
FIG. 4 depicts an illustrative embodiment of a system for distributing advertisements to a group of users.

FIG. 4 schematically illustrates a system 400 in which advertising is distributed to a group of users, in accordance with an embodiment of the disclosure. In an embodiment, a group of users 450 gather in a pre-defined area 410, and advertisement 140 is transmitted (pushed) to all users located in that area. In another embodiment, users 450 are gathered because they are already known to each other, and/or have similar interests. Advertisement 140 can then be transmitted to one member of the group, and subsequently shared by that member with the other members of the group using peer-to-peer communications.

In another embodiment, an advertising content provider 420 retrieves advertisements from storage 125, and distributes those advertisements on a timed basis to users located in area 410. For example, if the advertisement is associated with area 410 or with an event scheduled to occur in area 410, the advertisement can be distributed on a regular basis (daily, hourly, etc.) to any users present in area 410. In another embodiment, the advertisement is distributed to users 450 when the number of users reaches a threshold (for example, when a sufficient number of users with shared interests gather for a meeting).

Figure 5:
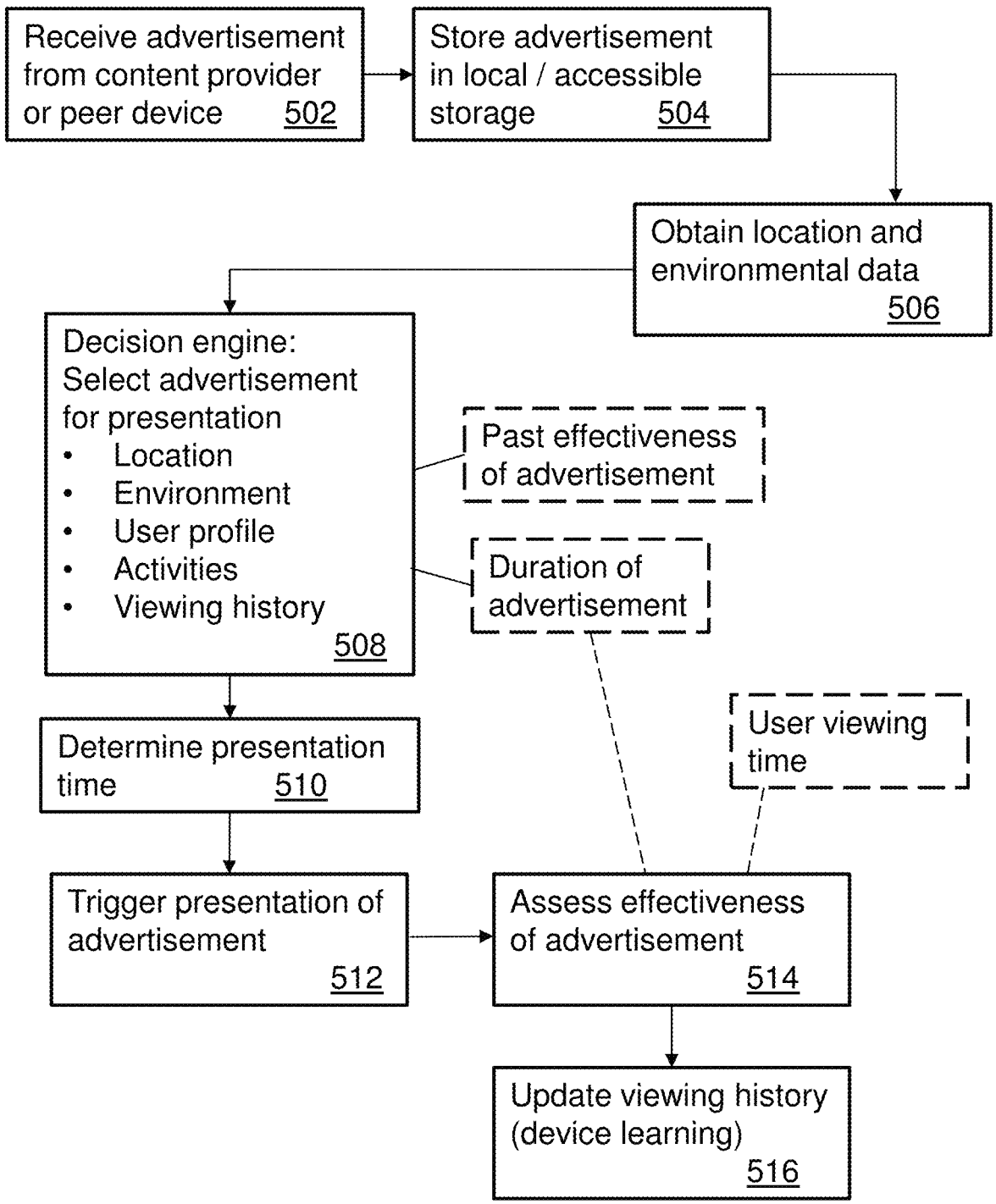
FIG. 5 depicts an illustrative embodiment of a method used in portions of the systems described in FIGS. 1-4.

FIG. 5 is a flowchart depicting a method 500 performed in accordance with embodiments of the disclosure. In step 502, a user communication device receives one or more advertisements from a content provider or from a peer device. The advertisement is stored locally at the user device 101 (step 504); alternatively, the advertisement can be stored at another location accessible to device 101. The user device obtains data regarding its own location and environment (step 506).

Decision engine 201 of the user device selects an advertisement for presentation to the user, depending on the user device location and environment, and the user's profile, activities and viewing history (step 508). In an embodiment, the decision engine also determines a time for presenting the advertisement (step 510).

The presentation of the selected advertisement is triggered at step 512. The effectiveness of the advertisement is then assessed (step 514). In an embodiment, this is done by comparing the duration of the advertisement with the length of the user's viewing time. The viewing history is then updated (step 516), including information regarding the effectiveness of the advertisement; the decision engine can refer to this information when determining whether to present the advertisement in the future, or present a different advertisement from the pre-loaded advertisements.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 6:
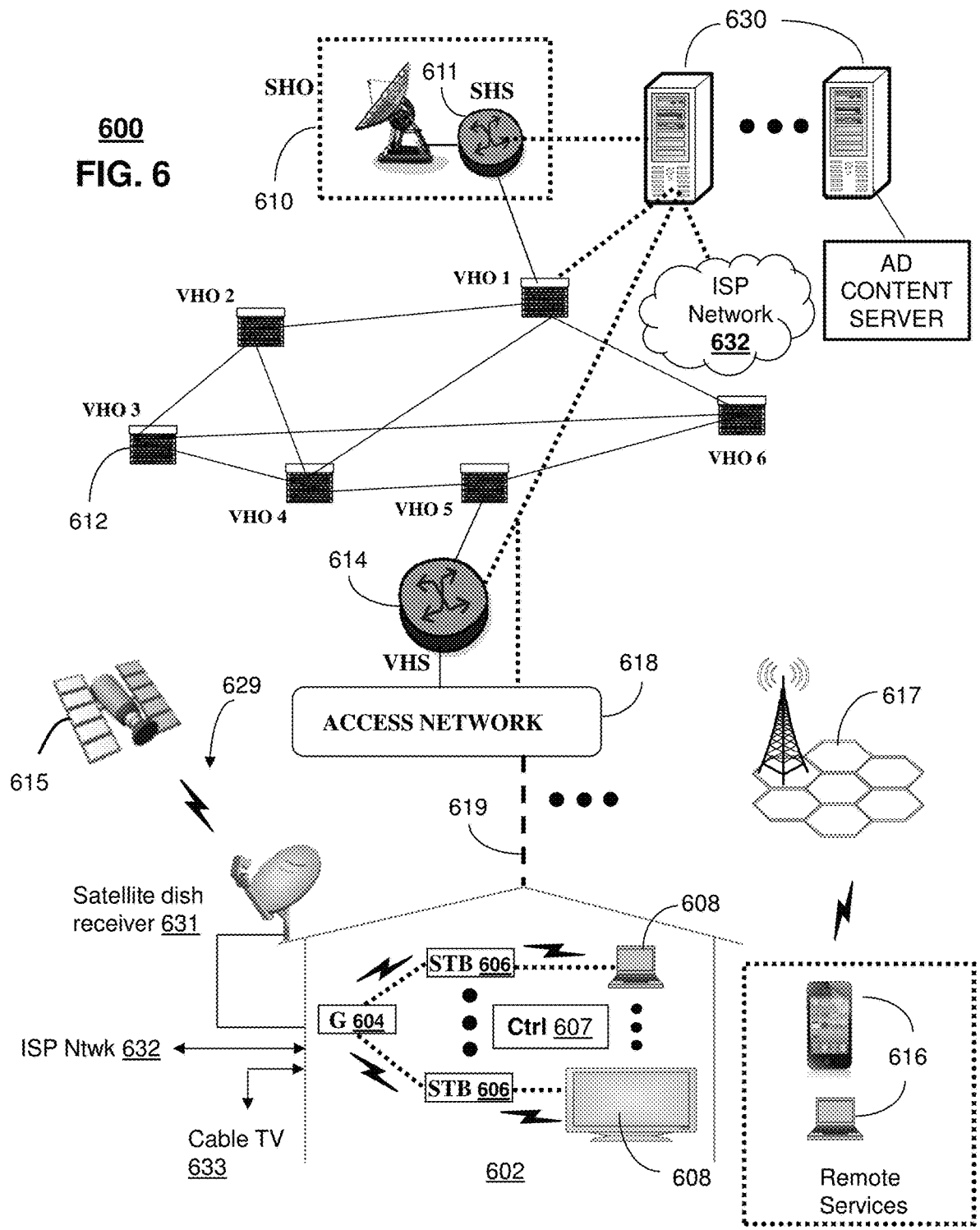
FIGS. 6-7 depict illustrative embodiments of communication systems that provide media services to the user devices of FIGS. 1-4.

FIG. 6 depicts an illustrative embodiment of a first communication system 600 for delivering media content. The communication system 600 can represent an Internet Protocol Television (IPTV) media system. Communication system 600 can be overlaid or operably coupled with systems of FIGS. 1-4 as another representative embodiment of communication system 600. For instance, one or more devices illustrated in the communication system 600 of FIG. 6 can include a processing system that performs operations that include receiving a plurality of advertisements from equipment of a remote advertising content provider, and storing the plurality of advertisements. The operations can also include determining a location of the device, obtaining environmental data associated with the device location, accessing a demographic profile of a user of the device, accessing a calendar of the user to determine activities of the user, and determining, based on an advertisement viewing history of the user, a duration of an advertisement to be presented to the user. The operations can further include selecting an advertisement from the plurality of advertisements for presentation at a presentation device; the selecting is based at least in part on the advertising viewing history and the duration of the advertisement and is based at least on the device location, the environmental data, the demographic profile, the activities, or a combination thereof. The operations can also include determining a presentation time for the advertisement, and transmitting a trigger message at the presentation time to the presentation device; the presentation device presents the advertisement responsive to the trigger message. The operations can further include determining a length of time that the advertisement is viewed by the user, assessing an effectiveness of the advertisement based on comparing the length of time with the duration of the advertisement, and updating the advertisement viewing history according to the assessing.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as an advertising content provider server (herein referred to as server 630). The server 630 can use computing and communication technology to perform distribution of advertisements for pre-loading at user devices, which can include among other things, procedures described by method 500 of FIG. 5. The media processors 606 and wireless communication devices 616 can be provisioned with software functions to utilize the services of server 630. For instance, functions of media processors 606 and wireless communication devices 616 can be similar to the functions described <for the communication devices FIGS. 1-4 in accordance with method 500.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, Fifth Generation Mobile Networks or 5G, and so on. Other present and next generation wide area wireless access network technologies can be used in one or more embodiments of the subject disclosure.

Figure 7:
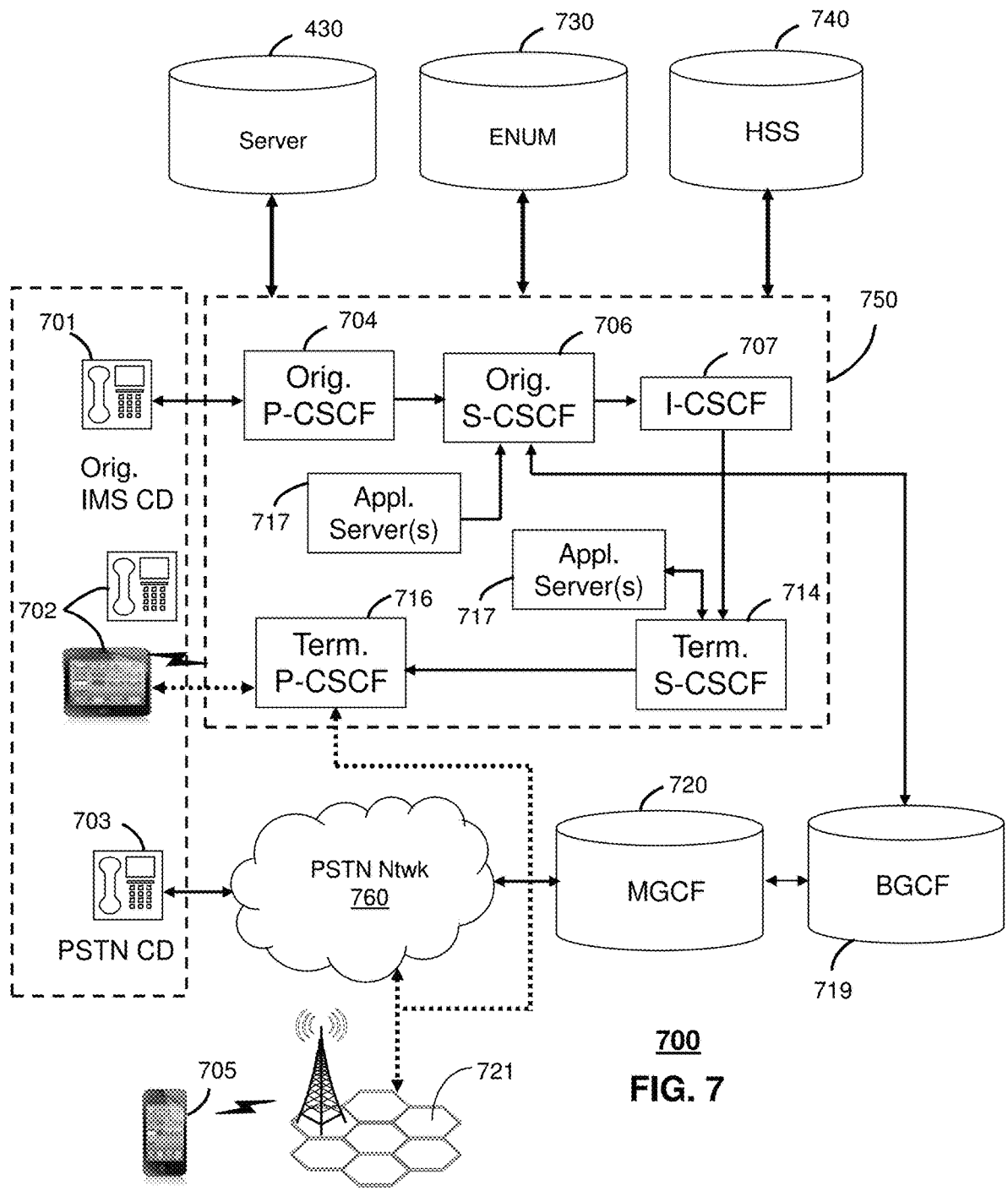

FIG. 7 depicts an illustrative embodiment of a communication system 700 employing an IP Multimedia Subsystem (IMS) network architecture to facilitate the combined services of circuit-switched and packet-switched systems. Communication system 700 can be overlaid or operably coupled with the systems of FIGS. 1-4 and communication system 600 as another representative embodiment of communication system 600. In particular, communication system 700 can perform a method including receiving a plurality of advertisements from equipment of a remote advertising content provider; storing the plurality of advertisements; determining a location of the processing system; obtaining environmental data associated with the location; accessing a demographic profile of a user; accessing a calendar of the user to determine activities of the user; and determining, based on an advertisement viewing history of the user, a duration of an advertisement to be presented to the user. The method can also include selecting an advertisement from the plurality of advertisements for presentation at a presentation device; the selecting is based at least in part on the advertising viewing history and the duration of the advertisement and is based at least on the location, the environmental data, the demographic profile, the activities, or a combination thereof. The method can also include determining a presentation time for the advertisement, and transmitting a trigger message at the presentation time to the presentation device; the presentation device presents the advertisement responsive to the trigger message. The method can also include determining a length of time that the advertisement is viewed by the user, assessing an effectiveness of the advertisement based on comparing the length of time with the duration of the advertisement, and updating the advertisement viewing history according to the assessing; the advertisement is selected based in part on the effectiveness of a past presentation of the advertisement.

Communication system 700 can comprise a Home Subscriber Server (HSS) 740, a tElephone NUmber Mapping (ENUM) server 730, and other network elements of an IMS network 750. The IMS network 750 can establish communications between IMS-compliant communication devices (CDs) 701, 702, Public Switched Telephone Network (PSTN) CDs 703, 705, and combinations thereof by way of a Media Gateway Control Function (MGCF) 720 coupled to a PSTN network 760. The MGCF 720 need not be used when a communication session involves IMS CD to IMS CD communications. A communication session involving at least one PSTN CD may utilize the MGCF 720.

IMS CDs 701, 702 can register with the IMS network 750 by contacting a Proxy Call Session Control Function (P-CSCF) which communicates with an interrogating CSCF (I-CSCF), which in turn, communicates with a Serving CSCF (S-CSCF) to register the CDs with the HSS 740. To initiate a communication session between CDs, an originating IMS CD 701 can submit a Session Initiation Protocol (SIP INVITE) message to an originating P-CSCF 704 which communicates with a corresponding originating S-CSCF 706. The originating S-CSCF 706 can submit the SIP INVITE message to one or more application servers (ASs) 717 that can provide a variety of services to IMS subscribers.

For example, the application servers 717 can be used to perform originating call feature treatment functions on the calling party number received by the originating S-CSCF 706 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 706 can submit queries to the ENUM system 730 to translate an E.164 telephone number in the SIP INVITE message to a SIP Uniform Resource Identifier (URI) if the terminating communication device is IMS-compliant. The SIP URI can be used by an Interrogating CSCF (I-CSCF) 707 to submit a query to the HSS 740 to identify a terminating S-CSCF 714 associated with a terminating IMS CD such as reference 702. Once identified, the I-CSCF 707 can submit the SIP INVITE message to the terminating S-CSCF 714. The terminating S-CSCF 714 can then identify a terminating P-CSCF 716 associated with the terminating CD 702. The P-CSCF 716 may then signal the CD 702 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 7 may be interchangeable. It is further noted that communication system 700 can be adapted to support video conferencing. In addition, communication system 700 can be adapted to provide the IMS CDs 701, 702 with the multimedia and Internet services of communication system 600 of FIG. 6.

If the terminating communication device is instead a PSTN CD such as CD 703 or CD 705 (in instances where the cellular phone only supports circuit-switched voice communications), the ENUM system 730 can respond with an unsuccessful address resolution which can cause the originating S-CSCF 706 to forward the call to the MGCF 720 via a Breakout Gateway Control Function (BGCF) 719. The MGCF 720 can then initiate the call to the terminating PSTN CD over the PSTN network 760 to enable the calling and called parties to engage in voice and/or data communications.

It is further appreciated that the CDs of FIG. 7 can operate as wireline or wireless devices. For example, the CDs of FIG. 7 can be communicatively coupled to a cellular base station 721, a femtocell, a WiFi router, a Digital Enhanced Cordless Telecommunications (DECT) base unit, or another suitable wireless access unit to establish communications with the IMS network 750 of FIG. 7. The cellular access base station 721 can operate according to common wireless access protocols such as GSM, CDMA, TDMA, UMTS, WiMax, SDR, LTE, 5G, and so on. Other present and next generation wireless network technologies can be used by one or more embodiments of the subject disclosure. Accordingly, multiple wireline and wireless communication technologies can be used by the CDs of FIG. 7.

Cellular phones supporting LTE can support packet-switched voice and packet-switched data communications and thus may operate as IMS-compliant mobile devices. In this embodiment, the cellular base station 721 may communicate directly with the IMS network 750 as shown by the arrow connecting the cellular base station 721 and the P-CSCF 716.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 630 of FIG. 6 can be operably coupled to communication system 700 for purposes similar to those described above. Server 630 can provide advertising distribution services to the CDs 701, 702, 703 and 705 of FIG. 7, similar to the functions described for server 120 of FIG. 1, in accordance with method 500 of FIG. 5. CDs 701, 702, 703 and 705, can be adapted with software to utilize the services of the server 630. Server 630 can be an integral part of the application server(s) 717 and adapted to the operations of the IMS network 750.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as Third Generation Partnership Project (3GPP). It is further noted that some or all embodiments of the subject disclosure may in whole or in part modify, supplement, or otherwise supersede final or proposed standards published and promulgated by 3GPP.

Figure 8:
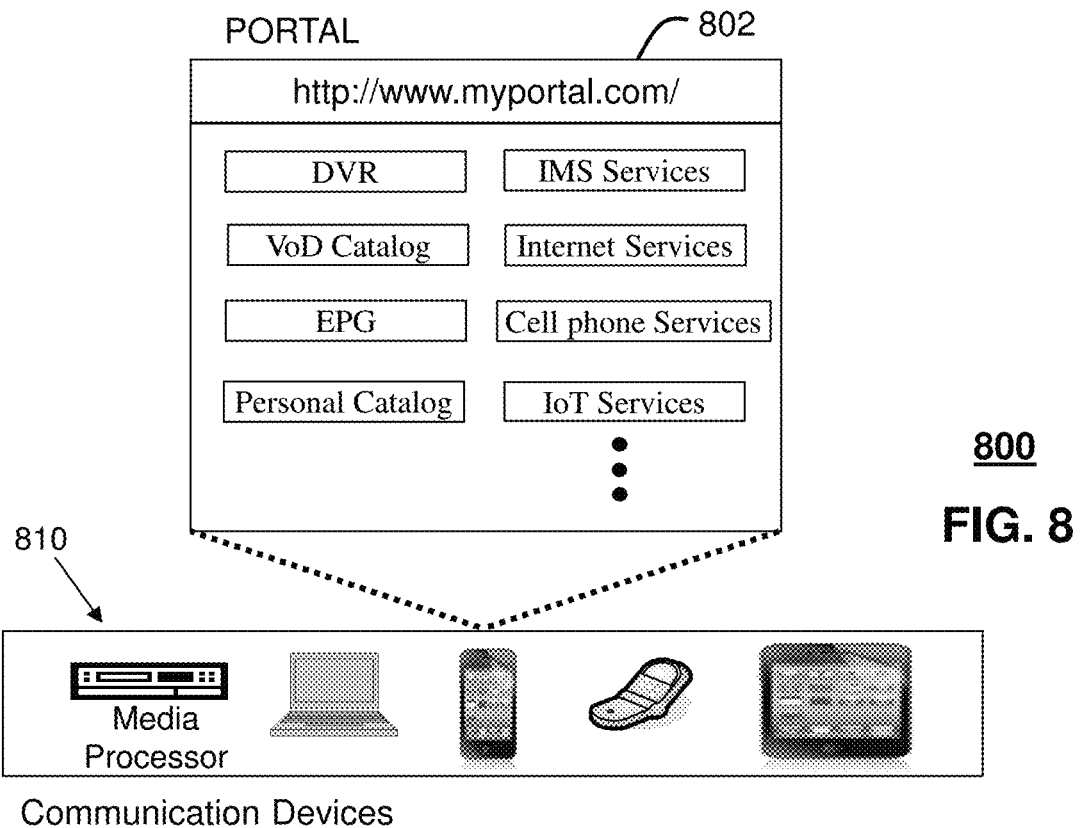
FIG. 8 depicts an illustrative embodiment of a web portal for interacting with the communication systems of FIGS. 1-4.

FIG. 8 depicts an illustrative embodiment of a web portal 802 of a communication system 800. Communication system 600 can be overlaid or operably coupled with the systems of FIGS. 1-4, communication system 600, and/or communication system 700 as another representative embodiment of communication system 600 and/or communication system 700. The web portal 802 can be used for managing services of the systems of FIGS. 1-4 and communication systems 600-700, and for providing services to communication devices 810. A web page of the web portal 802 can be accessed by a Uniform Resource Locator (URL) with an Internet browser using an Internet-capable communication device such as those described in FIGS. 1-4 and FIGS. 6-7. The web portal 802 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 802 can also be used for provisioning IMS services described earlier, provisioning Internet services, provisioning cellular phone services, and so on.

The web portal 802 can further be utilized to manage and provision software applications to adapt these applications as may be desired by subscribers and/or service providers of the systems of FIGS. 1-4 and communication systems 600-700. For instance, users of the services provided by server 630 can log into their on-line accounts and provision server 630 with user profiles, user viewing history, and so on. Service providers can log onto an administrator account to provision, monitor and/or maintain the systems of FIGS. 1-4 or server 630.

Figure 9:
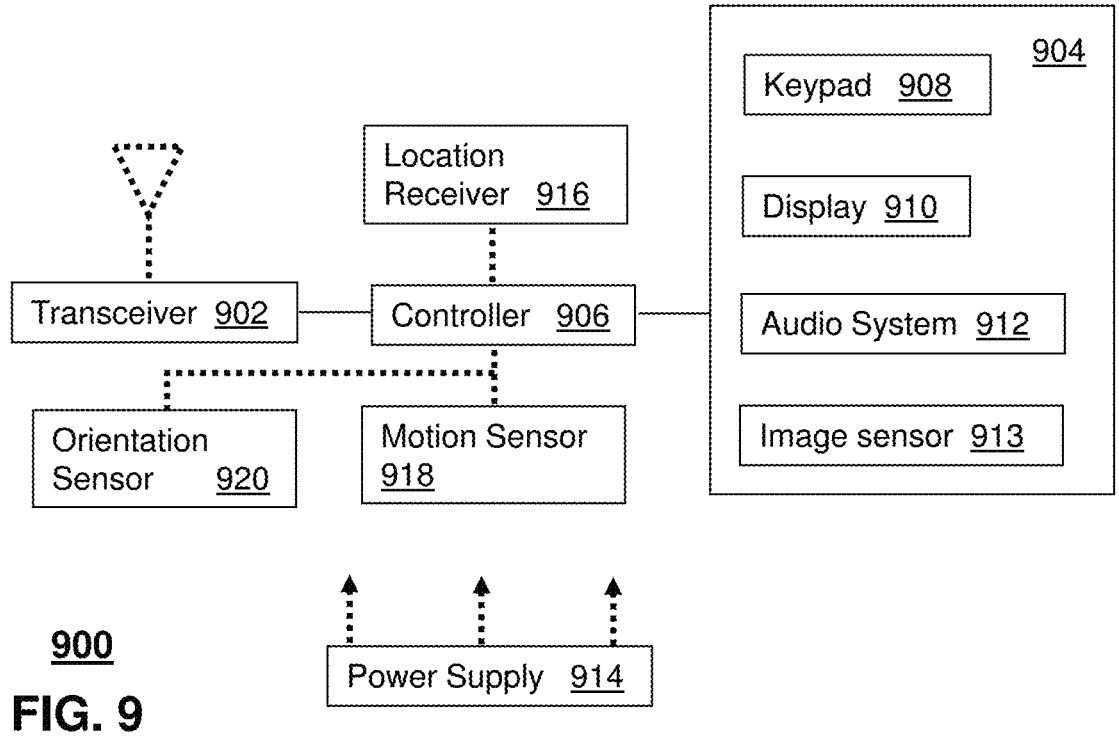
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1-4 and FIGS. 6-7 and can be configured to perform portions of method 500 of FIG. 5.

Communication device 900 can comprise a wireline and/or wireless transceiver 902 (herein transceiver 902), a user interface (UI) 904, a power supply 714, a location receiver 716, a motion sensor 718, an orientation sensor 720, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, 5G, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 710 such as monochrome or color LCD (Liquid Crystal Display), OLED (Organic Light Emitting Diode) or other suitable display technology for conveying images to an end user of the communication device 900. In an embodiment where the display 710 is touch-sensitive, a portion or all of the keypad 908 can be presented by way of the display 710 with navigation features.

The display 710 can use touch screen technology to also serve as a user interface for detecting user input. As a touch screen display, the communication device 900 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 900 or an independent device communicatively coupled thereto by a tethered wireline interface (such as a cable) or a wireless interface.

The UI 904 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 904 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 900 in three-dimensional space. The orientation sensor 720 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as memristors, Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 7. These variant embodiments can be used in one or more embodiments of the subject disclosure.

The communication device 900 can be adapted to perform the functions of devices of FIGS. 1-4, the media processor 606, the media devices 608, or the portable communication devices 616 of FIG. 6, as well as the IMS CDs 701-702 and PSTN CDs 703-705 of FIG. 7. It will be appreciated that the communication device 900 can also represent other devices that can operate in the systems of FIGS. 1-4, or in the communication systems of FIGS. 6-7 such as a gaming console and a media player.

Upon reviewing the aforementioned embodiments, it would be evident to an artisan with ordinary skill in the art that said embodiments can be modified, reduced, or enhanced without departing from the scope of the claims described below. For example, media segments can be preloaded into DVRs, computers, and other wireless devices, so that they can simply be triggered into presentation mode with a common signal through the network, or from an embedded content release trigger in other media based on predetermined characteristics extracted by analytics of Big Data lakes. Furthermore, in an implementation of the Internet of Things (IoT), focused advertisements can be stored and released for presentation on the IoT device or a collection of devices in an area, home, business, or community through local networks. Advertisements can be distributed (pushed) via broadcast methods, including but not limited to satellite, wired or wireless broadband, Wi-Fi, or Over the Air (OTA), and stored on local DVRs or other embedded storage platforms. Advertisements can be presented when appropriate as indicated by a triggering master signal or through a local embedded media event trigger. In these embodiments, an advertisement only has to be sent once to each subscriber.

According to embodiments of the disclosure, advertisements can be pushed via multicast, unicast or peer-to-peer distribution methods when one or more content consumers accesses media of a particular type, or when a device user is in the same network or proximity to another device accessing a particular media segment. For example, if a user is watching a televised football game on an IPTV-enabled TV while also browsing Facebook® on a phone or tablet on the same home network or while in the same location, then television advertisements and Facebook items related to the game, football, Facebook, etc., can be preloaded and presented at the phone and tablet as well as the television. This can be further driven by "Big Data" analytics that would reveal that the game is scheduled on the DVR, that the viewer's prior behavior indicates whether the football game will be watched in real-time on Sunday afternoon or delayed, and/or the length of the delay and specifics about programming that pre-empted real-time viewing. Distribution can be performed in real-time or delayed until there is a group assembled who would be likely targets for a focused media content package. In another embodiment, distribution can be deferred until network use is low, or when certain networks (e.g., home Wi-Fi) are available. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
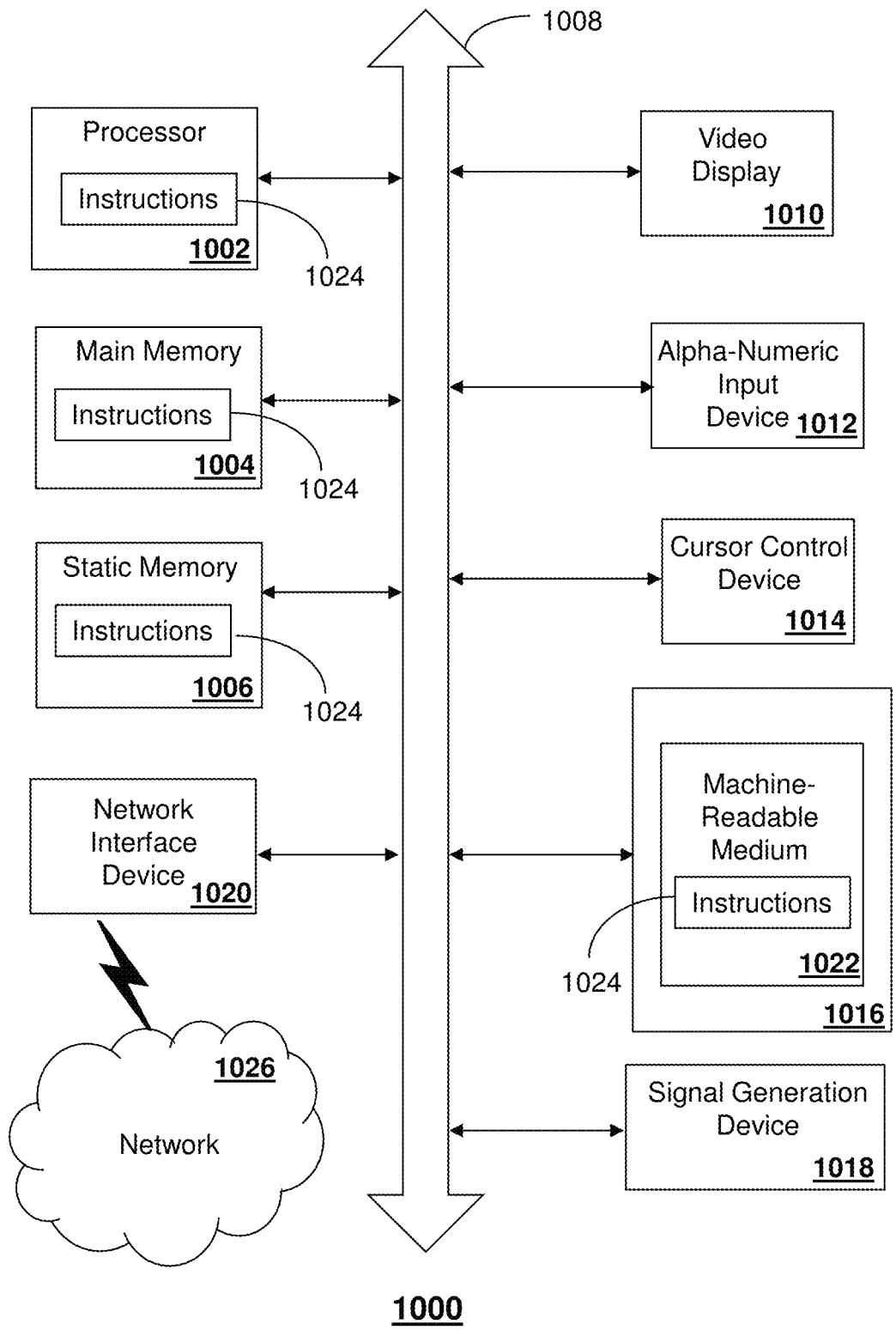
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the advertising content server 630, the user device 101, the peer device 153, and other devices of FIGS. 1-4 and 6-8. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories (e.g., memristors), random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, the operations comprising:
receiving, over a network, a plurality of advertisements from equipment of a remote advertising content provider;
storing the plurality of advertisements;
accessing, from the device, a calendar of a user to determine activities of the user;
accessing, from the device, an advertisement viewing history of the user;
accessing, by the device over a short-range, peer-to-peer communication session with a peer device, a viewing history of an other user associated with a peer device;
determining, based on the advertisement viewing history of the user, a time duration of an advertisement to be presented to the user;
determining, based on the advertisement viewing history of the other user, a time duration of an advertisement to be presented to the other user;
selecting an advertisement from the plurality of advertisements for presentation at a presentation device to obtain a selected advertisement, wherein the selecting is based at least in part on the advertisement viewing history of the user, the viewing history of the other user, and the time duration of the selected advertisement to be presented to the user and to be presented to the other user;
determining a presentation time for the selected advertisement;
providing, via a short-range, peer-to-peer communication session from the peer device, a trigger message at the presentation time to the presentation device, wherein the selected advertisement is pre-loaded at the presentation device, wherein the presentation device presents the selected advertisement to the user responsive to the trigger message;
obtaining, from the presentation device, information defining a length of time that the selected advertisement is viewed by the user for multiple presentations of the selected advertisement including a first presentation of the selected advertisement and a subsequent presentation of the selected advertisement;
assessing an effectiveness of the selected advertisement by determining if the subsequent presentation of the selected advertisement, engaged attention of the user for as long as the first presentation of the selected advertisement; and
updating the advertisement viewing history according to the assessing the effectiveness.

2. The device of claim 1, wherein the operations further comprise correlating the length of time the selected advertisement is viewed by the user with a time of day of the presentation time, based on a plurality of presentations of the selected advertisement.

3. The device of claim 2, wherein the plurality of advertisements is stored remote from the device.

4. The device of claim 1, wherein the trigger message is transmitted in response to a broadcast via a network from the equipment of the remote advertising content provider.

5. The device of claim 1, wherein the device is located within a predefined area, and wherein the plurality of advertisements is distributed by the equipment of the remote advertising content provider to a plurality of devices based on location of the plurality of devices in the predefined area.

6. The device of claim 1, wherein the selecting of the advertisement is further comprises, selecting the advertisement from the plurality of advertisements based in part on an effectiveness of a past presentation of the advertisement.

7. The device of claim 1, wherein the operations further comprise obtaining a decision engine via a peer-to-peer communication session, wherein the decision engine is adapted for the selecting of the advertisement from the plurality of advertisements.

8. The device of claim 1, wherein the plurality of advertisements is received via a broadcast over a network, a multicast, a unicast, or a combination thereof.

9. The device of claim 1, wherein the plurality of advertisements is received in a peer-to-peer communication session via another device coupled to the equipment of the remote advertising content provider.

10. A non-transitory, machine-readable medium, comprising executable instructions that, when executed by a processing system including a processor and a memory, facilitate performance of operations, the operations comprising:

receiving a plurality of advertisements from equipment of a remote advertising content provider;

storing the plurality of advertisements;

accessing, from the memory, a calendar of a user to determine activities of the user;

accessing, from the memory, an advertisement viewing history of the user;

determining, based on the advertisement viewing history of the user, a time duration of an advertisement to be presented to the user;

determining, based on an advertisement viewing history of an other user, accessed over a short-range, peer-to-peer communication session with a peer device, a time duration of an advertisement to be presented to the other user;

selecting an advertisement from the plurality of advertisements for presentation at a presentation device to obtain a selected advertisement, wherein the selecting is based at least in part on the advertisement viewing history and the time duration of the selected advertisement;

obtaining, in a short-range, peer-to-peer communication session from the peer device, a trigger message to the presentation device, wherein the selected advertisement is pre-loaded at the presentation device, wherein the presentation device presents the selected advertisement to the user responsive to the trigger message;

obtaining, from the presentation device, information defining a length of time that the selected advertisement is viewed by the user for multiple presentations of the selected advertisement including a first presentation of the selected advertisement and a subsequent presentation of the selected advertisement;

assessing effectiveness of the selected advertisement by determining if the subsequent presentation of the selected advertisement, engaged attention of the user for as long as the first presentation of the selected advertisement; and updating the advertisement viewing history according to the assessing the effectiveness.

11. The non-transitory, machine-readable medium of claim 10, wherein the operations further comprise determining a presentation time for the selected advertisement.

12. The non-transitory, machine-readable medium of claim 10, wherein the selecting of the advertisement further comprises selecting the advertisement from the plurality of advertisements based in part on an effectiveness of a past presentation of the advertisement.

13. The non-transitory, machine-readable medium of claim 10, wherein the operations further comprise obtaining a decision engine via a peer-to-peer communication session, wherein the decision engine is adapted for selecting the advertisement from the plurality of advertisements.

14. The non-transitory, machine-readable medium of claim 10, wherein the plurality of advertisements is received via a broadcast over a network, a multicast, a unicast, or a combination thereof.

15. The non-transitory, machine-readable storage of claim 10, wherein the plurality of advertisements is received in a peer-to-peer communication session.

16. A method, comprising:

receiving, by a processing system including a processor and memory, a plurality of advertisements from equipment of a remote advertising content provider;

storing, by the processing system, the plurality of advertisements;

accessing, by the processing system from the memory, a calendar of a user to determine activities of the user;

accessing, by the processing system, an advertisement viewing history of the user;

determining, based on the advertisement viewing history of the user, a time duration of an advertisement to be presented to the user;

accessing, by the processing system, over a short-range, peer-to-peer communication system with a peer device, an advertisement viewing history of an other user;

determining, by the processing system and based on the advertisement viewing history of the other user, a time duration of an advertisement to be presented to the other user;

selecting, by the processing system, an advertisement from the plurality of advertisements for presentation at a presentation device to obtain a selected advertisement, wherein the selecting is based at least in part on the advertisement viewing history and the time duration of the selected advertisement to be presented to the user and the time duration of the selected advertisement to be presented to the other user;

determining, by the processing system, a presentation time for the selected advertisement;

providing, by the processing system, in a short-range, peer-to-peer communication session, a trigger message at the presentation time to the presentation device, wherein the selected advertisement is pre-loaded at the presentation device, wherein the presentation device presents the selected advertisement to the user responsive to the trigger message;

obtaining, by the processing system from the presentation device, information defining a length of time that the advertisement is viewed by the user for multiple presentations of the selected advertisement including a first presentation of the selected advertisement and a subsequent presentation of the selected advertisement;

assessing, by the processing system, an effectiveness of the selected advertisement by determining if the subsequent presentation of the selected advertisement, engaged attention of the user for as long as the first presentation of the selected advertisement; and updating, by the processing system, the advertisement viewing history according to the assessing the effectiveness, wherein the selected advertisement is selected based in part on effectiveness of multiple presentations of the selected advertisement.

17. The method of claim 16, wherein the plurality of advertisements is stored remote from the processing system.

18. The method of claim 16, wherein the plurality of advertisements is received based on the processing system being located in a predefined area.

19. The method of claim 16, wherein the plurality of advertisements is received via a broadcast over a network, a multicast, a unicast, or a combination thereof.

20. The method of claim 16, wherein the plurality of advertisements is received in a peer-to-peer communication session via a device coupled to the equipment of the remote advertising content provider.

* * * * *